United States Patent [19]
Defferrari

[11] Patent Number: 5,222,342
[45] Date of Patent: Jun. 29, 1993

[54] COMPONENT ELEMENTS OF PROTECTING STRUCTURES AGAINST EROSION AND PROCESS FOR ASSEMBLING AND PLACING THE PROTECTION STRUCTURE

[76] Inventor: Francisco L. Defferrari, 1062, Buenos Aires, Argentina

[21] Appl. No.: 843,992

[22] Filed: Feb. 26, 1992

Related U.S. Application Data

[63] Continuation-in-part of Ser. No. 469,304, Jan. 24, 1990, abandoned.

[30] Foreign Application Priority Data

Jan. 27, 1989 [AR] Argentina .............................. 313090

[51] Int. Cl.⁵ .............................................. E04C 3/30
[52] U.S. Cl. ........................................ 52/594; 52/575; 52/604
[58] Field of Search ................. 52/609, 611, 575, 588, 52/604, 608, 606, 596; 405/15, 16, 17, 19, 20; 404/40, 41, 42, 43, 44, 45

[56] References Cited

U.S. PATENT DOCUMENTS 4,016,692 4/1977 Jordan et al. ...................... 52/604 X

FOREIGN PATENT DOCUMENTS 1265140 5/1961 France .
634939 2/1962 Italy ...................................... 405/16
368450 3/1932 United Kingdom ................. 52/575

Primary Examiner—Carl D. Friedman
Assistant Examiner—Creighton Smith
Attorney, Agent, or Firm—Scully, Scott, Murphy & Presser

[57] ABSTRACT

Protecting systems for coasts, breakwaters, slopes, dikes, sand dunes and similar, and more particular improvements in self-locking blocks forming component elements of protection structures against erosion, to the process of assembling said structure, as well as the resulting structure. The purpose is to afford a structure adapted to counteract the destructive and erosive action of external physical phenomena, such as wing, water, and the like, with respect to coasts, slopes, breakwaters, dikes and sand dunes.

10 Claims, 7 Drawing Sheets

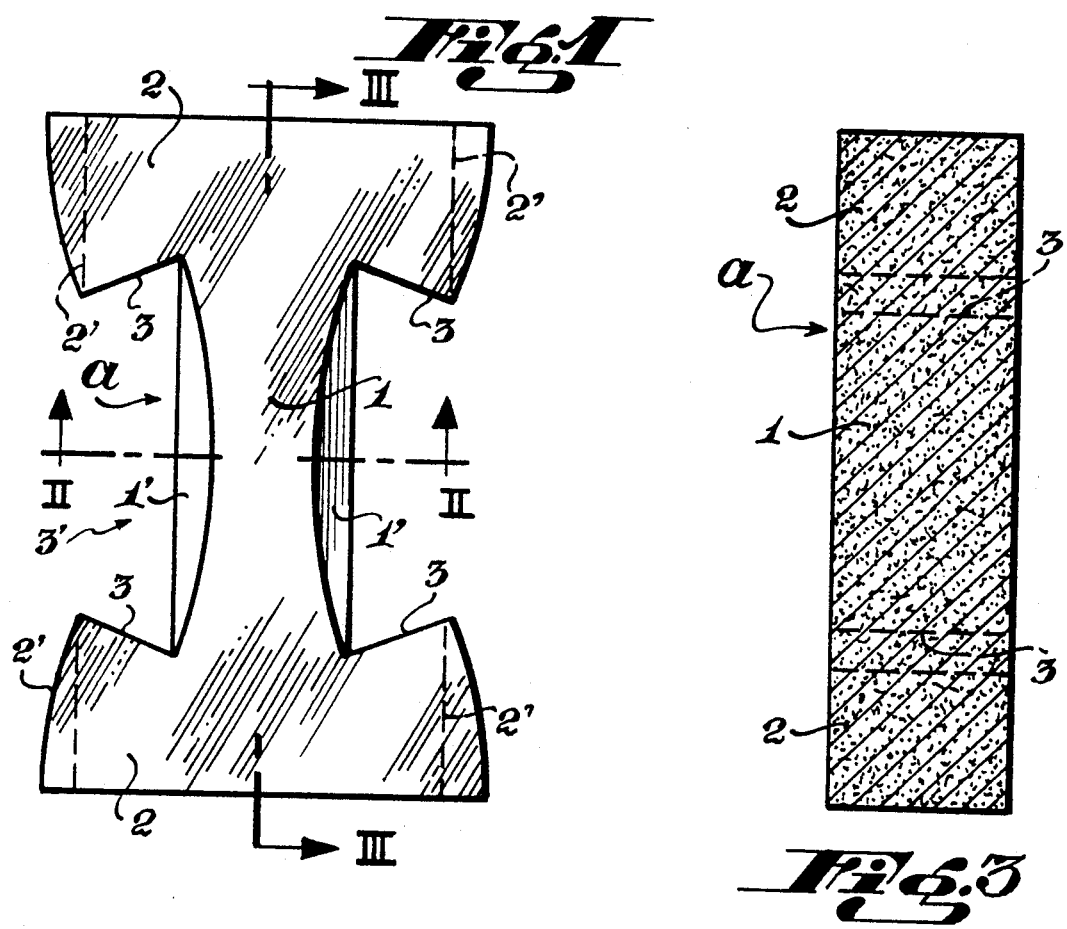
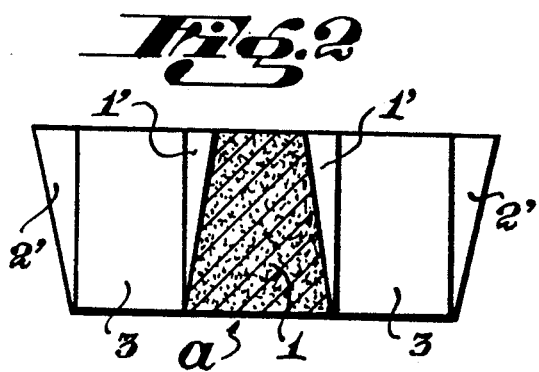

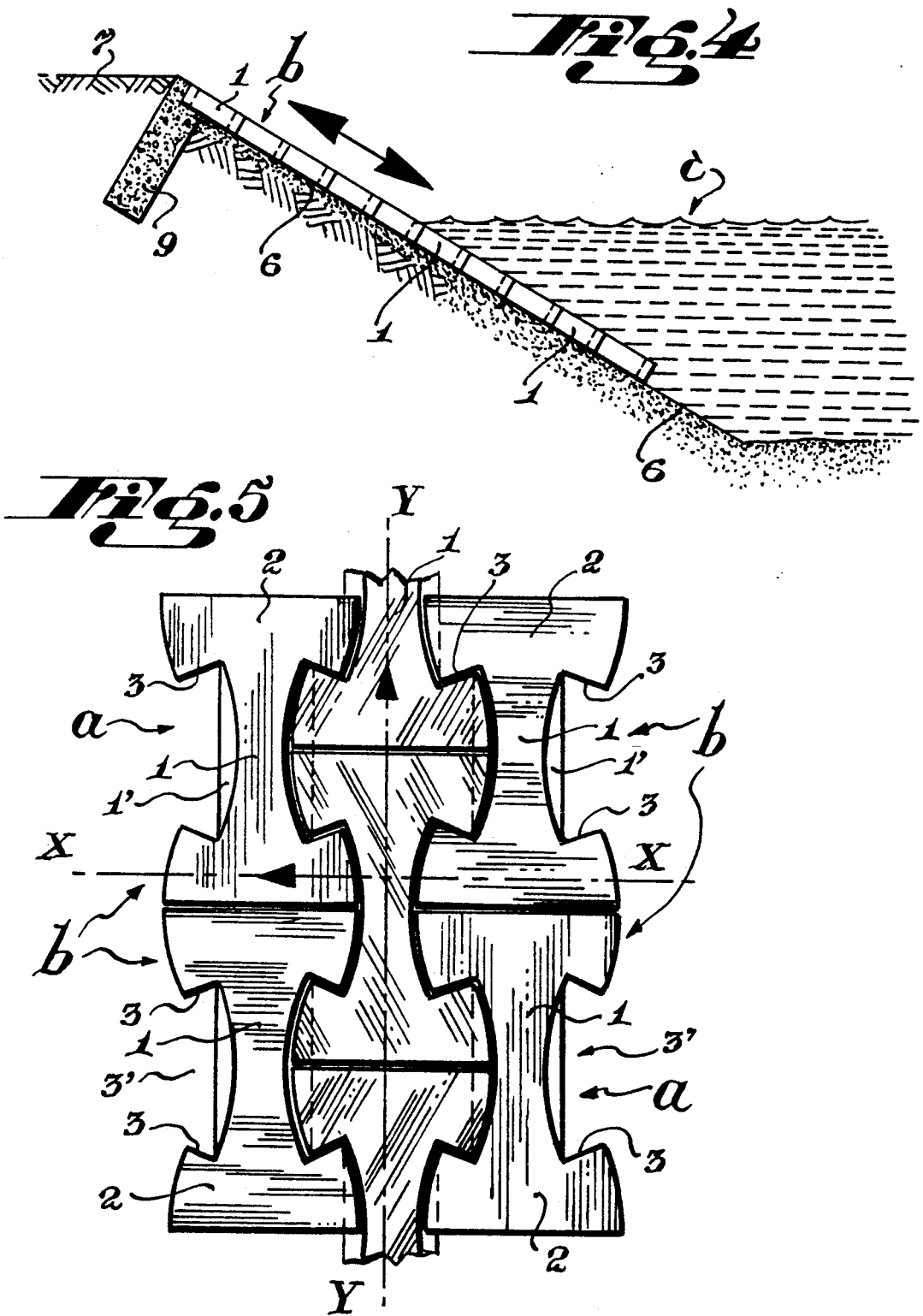

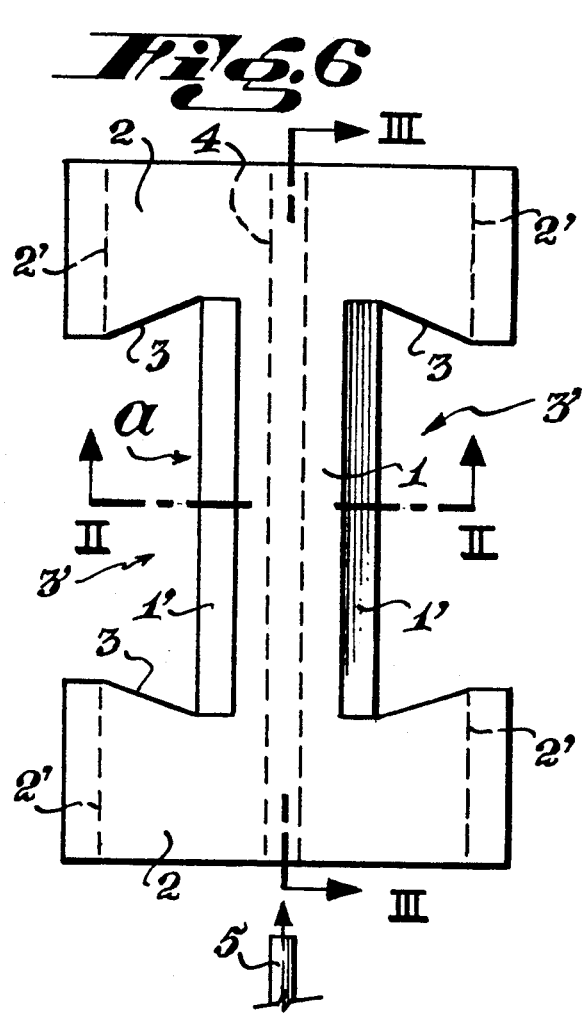
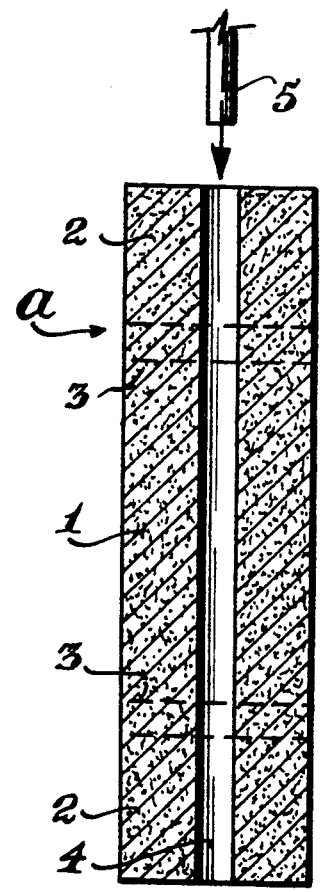
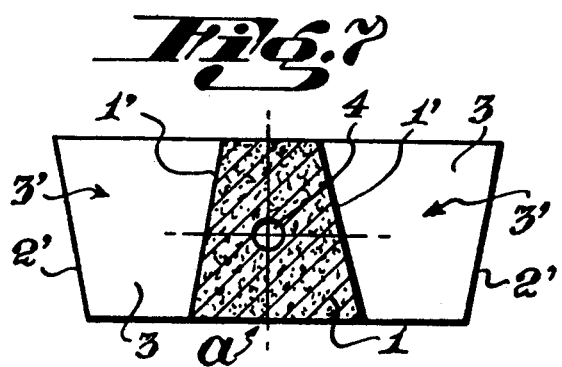

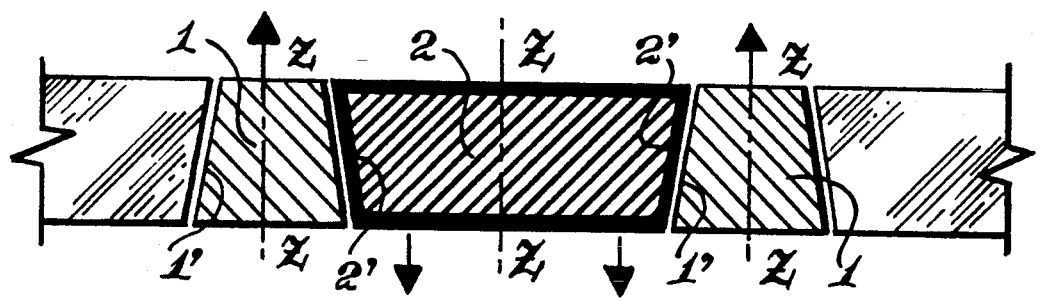
Fig. 12
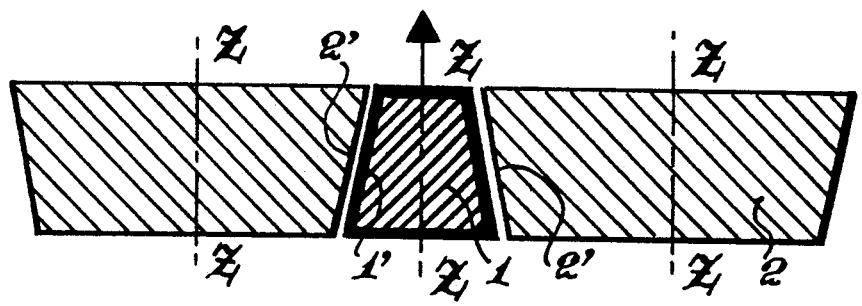
Fig. 13
Fig. 14
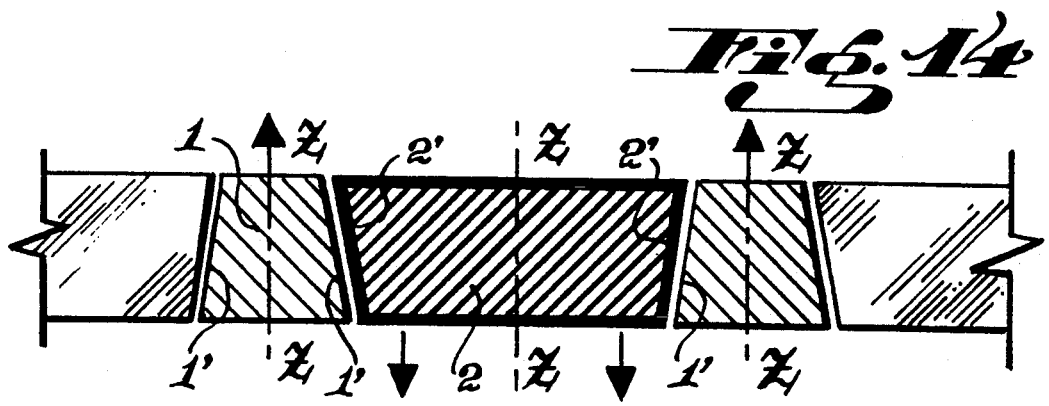

COMPONENT ELEMENTS OF PROTECTING STRUCTURES AGAINST EROSION AND PROCESS FOR ASSEMBLING AND PLACING THE PROTECTION STRUCTURE

This application is a continuation-in-part application of Ser. No. 469,304; filed Jan. 24, 1990 now abandoned.

BACKGROUND OF THE INVENTION

1. Field of the Invention

This invention refers to protecting systems of coasts, breakwaters, slopes, dikes, sand dunes and similar, and more particular refers to improvements in self-locking blocks, components elements of protection structures against erosion, to the process of assembling said structure, as well as the resulting structure. Inventively, it is a purpose to afford a means destined to counteract the destructive action of external physical agents—wind, water, etc.—with respect to coasts, slopes, breakwaters, dikes and sand dunes.

The physical agents which attack and damage this type of coasts, are of two species: the internal ones, with the phenomenon of siphonage and cutting of slopes due to the presence of tangentials tensions; and the external ones, in which intervene the erosive action of wind, waves, rain, tides, and the combined action thereof.

Traditionally, in the case of coasts protection, rockfills of stone aggregates, and vertical walls of rock blocks, containment walls of reinforced concrete and vertical sheetpiles in their different types have been used.

In regions such as the Argentine mesopotamia and humid pampa, for example, where the grounds are erosible and deposits of natural stone aggregates do not exist (or at least with a low cost operation), the protection with metallic vertical sheetpiles made of concrete has been used generally, anchored by tensors with special anchorage weights.

The disadvantage of this methods consists in that, as they are vertical walls, the active and passive thrusts, of the solid matter should be balanced by efforts in the tensor, generally subjected to important corrosive attacks, or else the waves "wash" the fine particles dragging them through the openings between one sheetpile and another sheetpile.

Both phenomena or the simultaneous action of these reduce the useful life of the protection or forces the implementation of costly maintenances. Another great disadvantage of the known method, resides in it complexity and high cost of construction.

The protection of erodible coasts is a very important chapter of any hydraulic work, recovery of low lands or harbor structures. It is of importance in the first place due to the great safety which it should confer to the coast, and in the second place—specially in zones without natural stone aggregates—by its high cost of supply and execution.

In the case of protections with anchored metallic sheetpiles and/or concrete, furthermore to the previously mentioned problems, generally exists a great difficulty in their execution, reason by which it requires highly specialized personnel and the technique of implementing them is very specialized and generally costly. This fact is worsened by the lack of possibility of detecting hidden vices or faults in the construction once the work is finished.

2. Discussion of the Prior Art

Some known structures, supply a defensive structure based in blocks coupled between each other. Among these principles, for example, is the object of French Patent 1.265.140 which consists in blocks of a double T configuration, that allow the coupling of the different blocks in a locking reciprocal way, with two of its axes of possible relation aligned to each other—and that correspond to the virtual axes of length and width of the blocks—but lacking any kind of locking in a third sense, i.e. the transversal to the plane defined by said aligned axes. This makes that, for the action of the water, tides or waves, said conventional blocks, though they have a coupling that resists the traction of the assembling in the sense of the axes virtually aligned to the structure, i.e. according to the orthogonal axes of width and length, they are not resistant in the transversal sense to the plane defined by said aligned axes; therefore, in said senses and due to the action of the above mentioned effects, they and by displacing easily.

Should there be any doubt in this reference left, it would be enough to observe FIGS. 1 and 10 to establish that effectively nothing could prevent the disconnection of the same in this sense. All of which makes said patent of costly application and furthermore of relative low effectiveness.

SUMMARY OF THE INVENTION

The above mentioned, plus the character of instable equilibrium in this type of known structures have been the reasons that carry to the investigation and development of the system of the invention, with which the following practical advantages among others are obtained:

a) Effective lock between the blocks, not only due to its axes being virtually aligned oriented according to the length and width of each block, but supplying means of additional locking that also ensure a locking effect in a third ax, transversal to the first two, eventually perpendicular.

b) Stable equilibrium of the protection work.

c) Speed of execution.

d) Simple transport and handling of the constitutive materials.

e) Ease of execution without requiring special equipments.

f) Low cost of materials and work execution.

g) Easy determination of hidden faults.

h) In case of using an assembly, the same has a simple constitution, of only one element (rod or cable) inserted by rows of blocks which is enough due to the security of the multidirectional lock.

On the other hand, it is the object of the invention to obtain the coast protection by adopting a slope or profiling in such a manner that it has stable equilibrium per se; i.e. that the angle of the slope with respect to the horizontal is less than the natural slope of the coast material or filling.

Due to the action of external agent of a dynamic type (waves) it is needed to provide to this slope a protection against crumblings localized in the point of contact with the moving water; as a protection recourses is had to to stone elements, which are described later, and the purpose of which is to assemble a concrete screen or mesh which receives and dissipates the energy transmitted by the waves against the coast, at the same time that by its own weight prevents the abovementioned breakages or erosions.

Now, in the experimental step carried out for said invention, although the behaviour of the resulting blocks and structures, has been as efficient as foreseen, some problems have emerged, however, with respect to the assembling of the structure itself, since it is difficult to carry out the binding in the setting bed, taking into account that said framework is to be installed under water.

This difficulty has forced to carry out several recources to emplace the structure in its site, such as assembling it out of the water, making it slide by the own slope to be protected; which complicates the control of the final position adopted, with the possibility that the protection remains arranged in unfavorable conditions.

Another manner of obtaining a better emplacement, was to proceed to raise a wall in the zone of location on the coast, producing a bailing of elimination of the water (to work as in a dry dock), and then to emplace the structures assembling it "in situ", after which the zone was again flooded for working normally.

It is obvious that this system is extremely burdensome and highly expensive, while it notably reduces the areas of application to those of limited depths.

The invention referred to by the present specification, further to the new block with the above-mentioned advantages, provides a new ingenious solution to the problems posed, by means of an assembly and emplacement methodology which allows the insertion of the blocks and their hoisting pre-coupled one to the other; at the same time, the structure in a whole is brought down, until it is placed in the correct and prefixed orientation in its position, on the respective bed.

This, by means of the new simple stringing elements, not to provide posterior subjection to the blocks which they don't need due to their multidirectional blocking but to the effects of the setting operation. With the advantages of being able to assemble the whole in the land, in less time, at a low cost, and making it possible at the same time to emplace protections at greater depths.

It must be taken into account that if the blocks of the present invention did't have their locking in the sense of the orthogonal aligned axes and in the sense transversal to said plane of said third axis the system of emplacement above mentioned could not be used.

In view of the foregoing, it is easy to imagine that said improvements will have great acceptance, both in the aspect of the new protection block in itself and in the one of the resulting structure of its assemblage and the method or process for assembling and emplacement, when carried into practice, in any category or destination they be given to, in view that the characteristics which define them, they lend themselves equally to be applied to the protection against erosions of any types of coasts, harbors, slopes, embankments breakwaters, etc.

With the specified purposes, the improvements in self-locking blocks, components of structures (b) of protection against erosion, are of the type which comprises a body (a) delimited by: two plane surfaces—superior and inferior—of selective setting, preferably parallel one to the other, having a double "T" configuration conform two heads (2) of outstanding and symmetrical portions, joined by a core (1); two external lateral faces (2') and (1') placed in the ends of the heads and sides of the core (1) respectively; and two lateral internal faces (3) in each head (2), which are comprised between the external lateral faces and said heads (2), and the lateral faces of the core (1); being all said lateral faces—(1') of the core (1) and (2') and (3) of the heads (2)—transversal to the face surfaces destined to the selective support of the block; and being the longitude of said core (1), equal to the summing of the existent distance between the internal lateral face (3) and the external lateral face (2') of both outstanding sections of said heads (2); said improvements characterized in that the lateral faces (1') of the core (1) are bent converging towards one of the plane surfaces of the block, while the lateral external faces (2') of the heads (2), are bent with opposite convergency to said lateral faces (1') of the core (1).

BRIEF DESCRIPTION OF THE DRAWINGS

For a better clarity and understanding of the object of the invention, it is illustrated by several figures, wherein it has been shown in one of the preferred embodiments; all of this is a mere title of enunciative example, non limitative, being:

FIG. 1, a plane view of a block or type element integrating the structure, in one of the non limitative embodiments, which permits to appreciate its basic configuration in "Double T", showing the presence of the lateral bent faces destined to confer a better adjustment between block and bolck, defining the locking effect not only according to axes of length and width, but transversally as well.

FIG. 2, a cross section of the same block, by a plane II—II indicated in FIG. 1, in which it is seen the profile with bent faces in way of bevels and chamfers destined to give a multidirectional wedging effect.

FIG. 3, a longitudinal section of the same block, by a plane indicated as III—III in FIG. 1.

FIG. 4, a schematic detail of the assembled dike, with a protection structure arranged in slope on a filtering permeable base.

FIG. 5, a plane view of the assembled structure, which gives a clear idea of the manner in which the component elements are coupled, forming locking or resistant chains to traction in three senses. In this figure, it is illustrated the resistance to traction according to the senses of its orthogonal axes (see arrows) as well as the shear according to the sense of one of said axes, which also corresponds to the sense of the tides.

FIG. 6, an elevational view of one of blocks according to the present invention and as a variation of the embodiments of FIGS. 1 to 5, which further to the characteristics already defined in the main patent, shows the presence of the longitudinal perforation by stringing or cable with the purpose of serving to the assembly and setting of the structure.

FIG. 7, a cross section of the block, by the plane indicated as II—II in FIG. 1, clearly showing the presence of said longitudinal perforation of stringing.

FIG. 8, a longitudinal section of the same block, by the plane indicated as III—III in FIG. 1, and which specifically permits to appreciate how the stringing longitudinal perforation already mentioned in FIGS. 6 and 7, is extended, all the length of the block and finishes with both its ends open.

FIG. 12, a cross section of the structure, according to the section of plane shown as XII—XII in FIG. 11 and that shows the way in which the blocks lock according to a transversal plane to the orthogonal axes of width and length of each block.

FIG. 13, a cross section of the structure according to a section of plane shown as XIII—XIII in FIG. 11, showing the way in which the transversal locking is produced in this zone.

FIG. 14, a cross section of the structure according to a section of plane shown as XIV—XIV in FIG. 11 with the indication of the sense of the locking axes in the zone of this section.

DETAILED DESCRIPTION OF PREFERRED EMBODIMENTS

Figure 9:
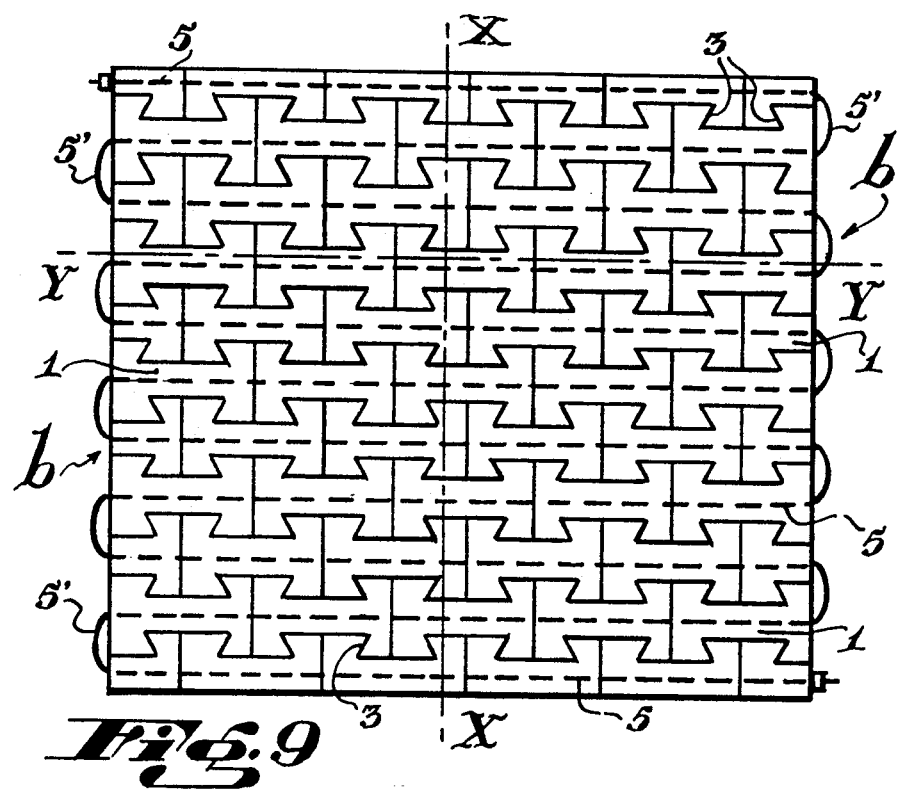
FIG. 9, a plane detail of the protection structure assembled with the blocks of FIGS. 6 to 8, after being reciprocally inserted, and further stringed by means of a continuous cable inserted along all said perforations in each rows of blocks.

In the different figures, the same reference number show the same parts, or corresponding ones; having shown the set of several elements with letters.

These references correspond to the following detail:
(a) body of block
(b) protecting structure, composed by blocks (a)
(c) mass of water (in which bed the structure is emplaced -b-)
(d) conveying means for emplacement of (b) in (c)
(Y—Y) virtual locking axis, in the longitudinal sense of the length of body (a); this axis is aligned with X—X.
(X—X) virtual locking axis in the sense of the width of the body (a); this axis is aligned with the Y—Y.
(Z—Z) virtual locking axis in the transversa sense of the body (a). This virtual axis is normal to the other two: X—X/Y—Y
(1) core of block
(1') bent lateral faces of (1)
(2) heads of block (in T with reference to the core (1)
(2') exterior lateral faces of (2)
(3) interior lateral faces of the heads (forming heels in said faces).
(3') tongue and groove cavities (delimited between faces -2'- and -3-
(4) longitudinal through perforation of (a)
(5) perforating block cable.
(5') cranked terminals of (4')
(6) permeable and filtering material layer (geotextile membrane)
(6') supporting structure
(7) slope or supporting bed
(9) anchor of structure (b)

Generally, the protecting structure (b) is constituted by a plurality of body blocks (a), locked between each other, forming an ensamble supply by means that at least confers them resistance to the traction (and furthermore to the section) in the sense of three virtual axes: a first locking axis resistant to the traction in the longitudinal sense (Y—Y) of the body (a); a second virtual locking axis (X—X) resistant to the traction in the sense of the body width (a) (FIG. 11); and particularly in this case, a third virtual locking axis (Z—Z) (FIGS. 12-14), resistant to the traction in the transversal sense of each body (a); i.e. transversal to the virtual convention plane of axis (X—X) and (Y—Y) first mentioned. Being this protection structure (b) placed over a filtering permeable material layer that allows the passing of water, but prevents the dragging of soil particles or other slope materials (7) that is preserved (FIG. 4); anchoring the structure (b) by a means of anchoring (9) introduced inside the slope (7).

More particularly, and as can be seen in the figures, in one of the preferred embodiments -non limitative-the filtering and permeable material layer, is formed by a geotextile membrane, which coats a slope (7) of earth which gradually penetrates from the coast into the mass of water (c) at a sufficient depth; and over said layer (6) supports the protection structure (b), as can be seen in FIG. 4.

According to the embodiment of FIGS. 1 to 3, each body (a) component of said protecting structure (b) comprises adequate blocks of concrete or similar, which seen in plane, have a double "T" configuration (FIGS. 1, 5, 6, 9 and 11) formed by: an intermediate wall which constitutes the core (1), said wall is elongated in the longitudinal sense of all the body (a) and having its endings joined to both heads (2) has laterally by way of bevels, bent faces (1') that being bent in reference to the longitudinal geometric plane of the same body (a), constitute means of locking adjustment with other blocks equally constituted.

These heads (2), each one of which defines two outstanding co-lineal sections present thus the particularity of being delimited by: the proportional part of the plane surfaces and parallel to the block selective setting, in their endings by the lateral external faces (2') oblique in reference to the setting surfaces, and between these and the lateral faces (1') of the core (1), by other lateral internal faces (3) perpendicular that, as can be seen in the drawings, constitute a kind of blocking heels in reference to the geometrical transversal axis of the body (a) and, furthermore having lateral faces of perpendicular ending, jointly with the oblique faces that form the locking heels, confer to each heel a similar profile to an "ax head" (FIG. 1). The external lateral faces (2') have a similar bend to the faces (1') already mentioned, but with opposite sense to those of the lateral faces (1') that are immediate to each body flank (a) (FIGS. 1 and 2).

As can be seen in FIGS. 1 and 6, the presence of each pair of internal lateral faces (3) confronted, corresponding to the heads (2), define the conformation of a cavity (3'), whose bottom is the lateral face (1') of the intermediate wall of the core (1), and ends gradually reducing the width, in the tongue-and-groove way.

Figure 11:
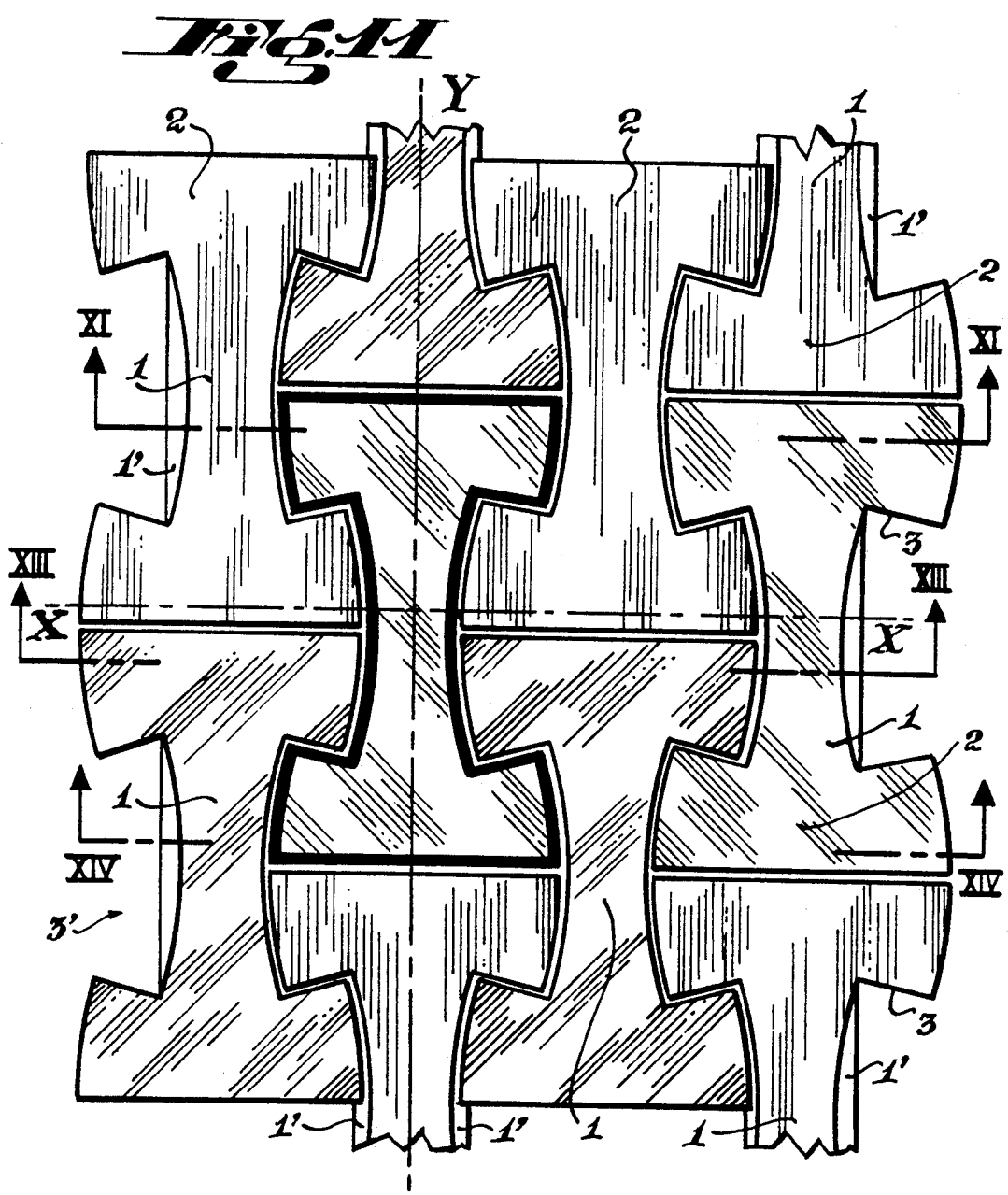
FIG. 11, a detail of the protection structure—without it perforations—so as to be a reference to the representation of the sections in the figures that follow stating in this figure the resistance to the traction among blocks, with locking produced according to two of its three axes; in the illustrated case, corresponding to the length and width and showing one of the blocks more outstanding than the rest.
Figure 15:
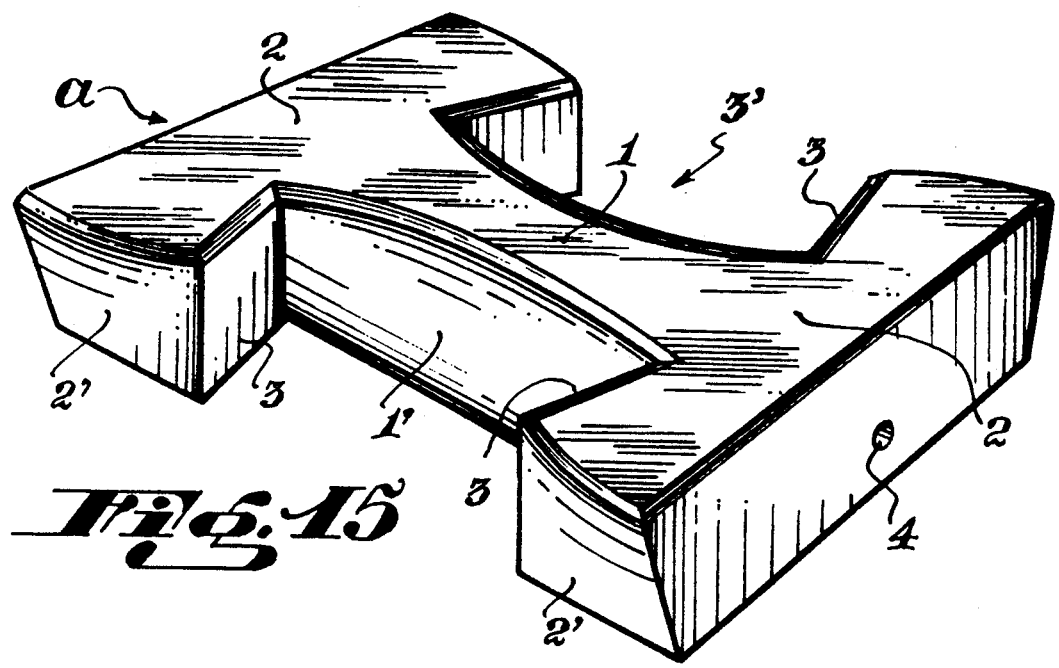
FIG. 15, a perspective view of the block, that specially allows to show the bending of the faces that produce the locking according to a transversal ax to said block in reference to the others that form the same structure; and finally FIG. 16, another perspective view of the same block of FIG. 15, but observed by the reverse face shown by that one.
Figure 16:
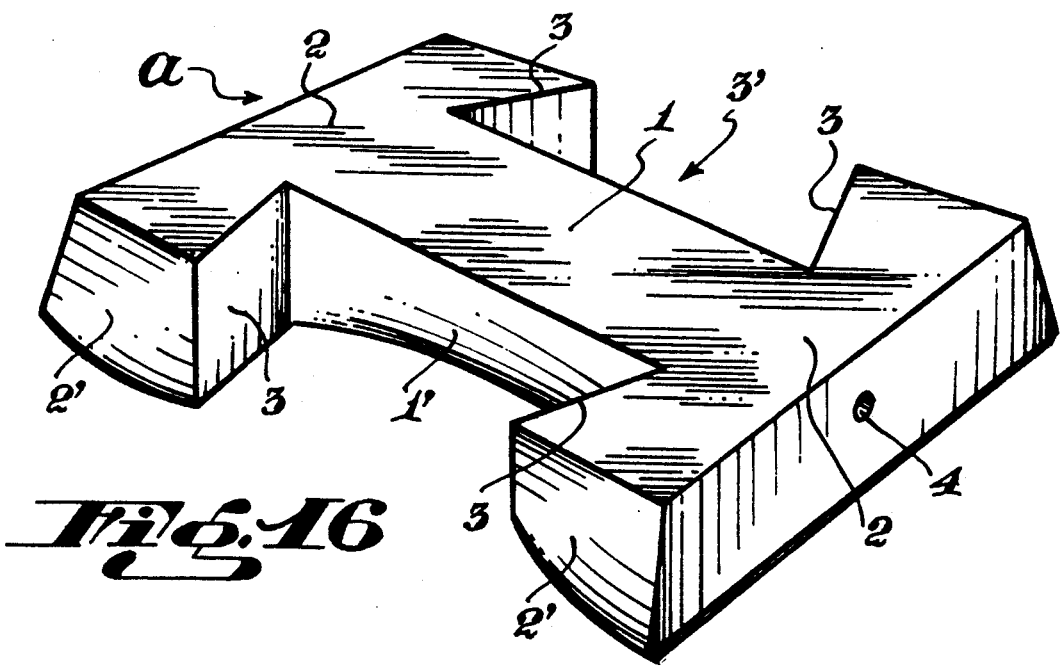

The plane section of each tongue-and-groove cavity (3') -delimited by the heels of the internal faces (3)- is equivalent to the sum of the thickness of the projected sections of the heads (2) finished in "way of ax" and opposed corresponding to two blocks (a) sequentially side to side in chain (FIGS. 5, 9 and 11).

Fundamentally, this lock is produced by the opposite wedging between the lateral bent faces (1') and (2'), FIGS. 11 to 16.

In the embodiment of FIGS. 6 through 9, each body (a) shows the particularity of being affected by at least a through perforation (4) oriented in longitudinal sense of the same and opening on the end faces of the heads (2); defining each longitudinal perforation (4) so arranged a stringing means of the different blocks (a) constituting the same protecting structure (b), FIGS. 6 through 8, by means of flexible rods or steel cables (5) that penetrate in said perforations (4) and follow a "zigzag" path between assembly and assembly of aligned perforations (4) joining sections by cranked endings (5') of the same cable (5) that result disposed in two of the opposite border limits of the conformed structure (b) (FIG. 9).

The elements are coupled one to the other as shown in FIGS. 5, 9 and 11, and the structure (b) works so with resistance to the traction by three virtual axes: a longitudinal axis (Y—Y), oriented in the longitudinal sense of each body (a), which for the action of the internal lateral faces (3) that work as heels (inserted according to FIGS. 5, 9 and 11) prevent their unlocking by the effect of the traction in accordance to the sense of said axis (Y—Y); a resistant axis (X—X) in the sense of the width of the blocks, effect which is also helped by the presence of the inserted heels as mentioned, and prevents the dislodging of the blocks according to the sense of those both axes (X—X) and (Y—Y) that are orthogonal and respectively aligned; and one of which (for example in Y—Y), corresponds with the sense of the tide.

But, particularly, in the present case, due to the presence of the lateral faces (1') and (2'), the blocks lock within the structure (b) according to a third virtual axis (Z—Z) transversal resistant that prevents that said blocks disconnect or dislodge upwards or downwards the structure (b), as shown in FIGS. 12 to 14. This due to the fundamental fact that the lateral faces (1') corresponding to the core (1), have a bend towards one of the principal surfaces of the selective setting of the blocks while the exterior lateral faces (2') corresponding to the heads (2), are bent in opposite direction to the one of the faces (1'), i.e. bent to the other surface of selective support. Which guarantees a perfect locking.

So much so, that if this structure (b) were hung from two of its endings, it would not disassemble.

In fact, as can be seen in FIGS. 11 and following, when inserting the blocks (a) to form the referred structure (b), in the section shown as XII—XII in FIG. 12, the external bent faces (2') of the head (2) of each block, wedge between the bent lateral faces (1') corresponding to the intermediate walls of the core (1) of the blocks that are next in the considered section preventing their relative displacement between each other according to the transversal sense of the axid (Z—Z).

In section XIII—XIII that shows FIG. 13, the intermediate wall of the core (1) of the same considered body (a)—drawn with thick traces in FIGS. 11 to 14—has the faces (1') of the intermediate wall of the core (1) wedged with the external faces (2') of the heads (2)—according to the transversal axis (Z—Z)—corresponding to the blocks (a) adjacent in said zone.

While in section XIV—XIV that shows FIG. 14 of the same considered body (a), the head (2) has the external and bent faces (2') wedged—according to ax (Z—Z) with the opposite lateral and bent faces (1') corresponding to the core (1) of the blocks (a) which are adjacent in said zone to section XIV—XIV shown in FIG. 11.

All this makes the resultant structure (b) resistant enough to adequately protect the coast of the slope (7) to which it is applied to.

In the case of the perforated embodiment of FIGS. 6 through 8, with the purpose of assembling said structure (b), the component blocks (a) of the same row, are locked one to the other in alignment, and arranged in such a manner that their respective longitudinal perforations (4) become co-linear, forming a common perforation (4) for them all, through which a galvanized steel cable (4') is inserted, which function is to facilitate the handling and permit the placement of the protection under water on the bed (c).

The cable (5) is inserted in a configuration of zig-zag into the different conduits or perforations (4), forming end bendings, and finishing with its terminals (5) topped in such a manner that they cannot move or be dislodged from its stringing position of blocks (a), FIG. 9.

Owing that between one and the other emplaced element (a) always occurs a joint—which is an empty space wherein the water backflow may drag soil particles and produce an excavation, under the concrete meshing (b) and over the slope (7) or coast in each case, a geo-textile membrane of polypropylene should be placed in the manner of a filter. Finally, the joint should be covered with medium or coarse sand, with which a mutual locking of the blocks (a) is obtained.

Figure 10:
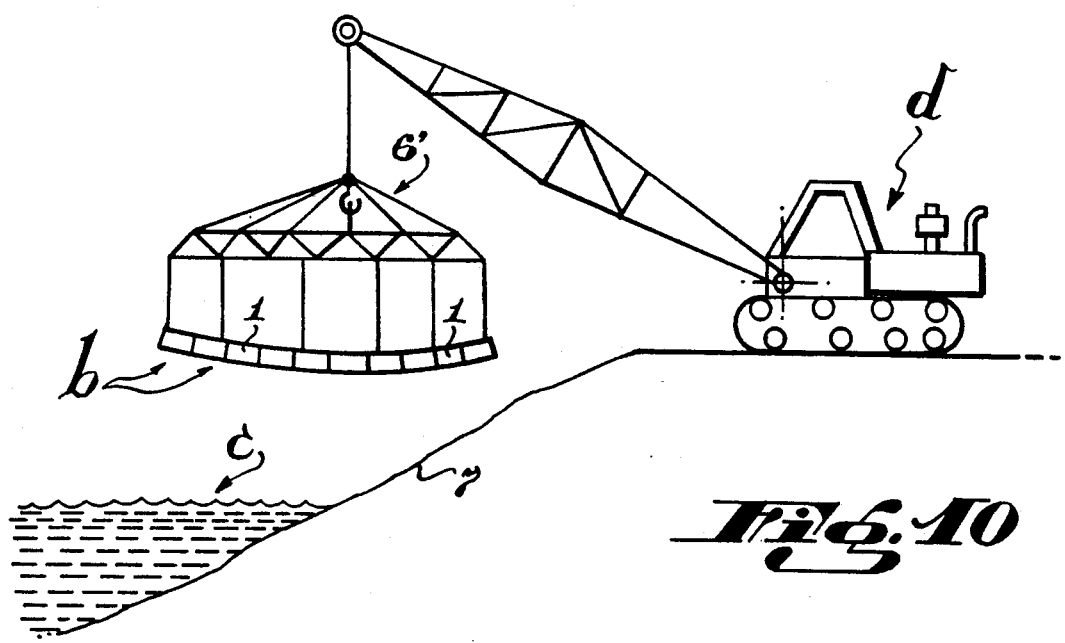
FIG. 10, a schematic detail showing how the protection structure and its supporting framework, are hoisted by a boom for its emplacement in the water bed.

Then a supporting frame (6') is prepared, which is joined to the cable (5) of the structure (b), and all the assembly (a-b) is hoisted by means of an elevating device (boom, crane, etc) shown as (d), making it possible to elevate and put down so all the framing of protecting blocks (a) mutually locked, down to the emplacement on the corresponding bed (c), FIG. 10.

Undoubtedly, when the present invention is carried into practice, modifications related to construction details and form can be introduced, without implying a separation from the fundamental principles which are cleraly subtantiated in the following claims.

What is claimed is:

1. In self-locking blocks constituting component elements of protecting structures against erosion; the improvement comprising in that each said block includes a body defining two planar surfaces of selective setting extending substantially parallel to each other, said surfaces forming a double T-configuration comprising two heads of diverging and symmetrical sections, and a core joining said heads; two lateral external faces disposed in the ends of the heads and the proximate sides of the core, respectively; and two internal lateral faces in each head, which are located between lateral external faces of said heads, and lateral faces of the core, said lateral faces of the core and heads extending transversally of the planar surfaces for the support of a selective block and being of the length of said core so as to be equal to the sum of the distance between the lateral internal face and the lateral external face of both diverging sections of said heads, the lateral faces of the core being bent towards one of the planar surfaces of the block, whereas the lateral external faces of the heads are bent towards a direction opposite to the direction of said lateral faces of the core to enable locking a plurality of said blocks to each other in a direction extending perpendicular to the plane defined by the orthogonal axes of each block.

2. Improvement in self locking blocks component elements of protecting structures against erosion; according to claim 1, characterized in that each block is affected by at least a through perforation in the longitudinal sense, in the nature of passage of a stringing means for the different blocks constituting one and the same protecting structure.

3. Improvements in self locking blocks component elements of protecting structures against erosion; according to claim 1, characterized in that, in longitudinal sense, each block is affected by a perforation open in both ends, which in a continuous manner comprises all the length of the intermediate wall and is extended through the transversal walls to finish opening in the head faces of the transversal walls, forming the passage for a cable stringing the different blocks constituting one and the same protecting structure.

4. A protecting structure against erosion, formed by employing the elements of claim 1, characterized by comprising a plurality of elements couplable one to the other, which constitute mutually locking chaining, resistant to traction according to two axes aligned oriented in the sense of the length and width of said blocks and a locking effect according to a third ax transversal to the first two being the same blocks furthermore resistant to shear in accordance to one of said axes corresponding to the sense of the tide; said structure being supported on a filtering permeable material layers.

5. A protecting structure against erosion, formed by employing the elements of claim 1, characterized in that it is arranged covering a slope which gradually penetrates in the mass of water, down to a sufficient depth, with the insertion of a filtering permeable material layer.

6. A protecting structure against erosion, formed by employing the elements of claim 1, characterized in that it is arranged covering a slope which gradually penetrates in the mass of water down to a sufficient depth, with the insertion of a filtering material layer; the protecting structure including at least a member which, projected into the slope, penetrates into the zone corresponding to its highest level, in the nature of an antisliding retention means.

7. A protecting structure against erosion, formed by employing the elements of claim 1, characterized in that it is arranged forming a horizontal wall, with the insertion of a filtering permeable material layer.

8. A protecting structure against erosion formed by employing the elements of claim 1 characterized in that the filtering permeable material is constituted by a geotextile membrane.

9. A protecting structure against erosion formed by employing the elements of claim 1, characterized in that the blocks coupled one to the other and constituting mutually locking chainings, resistant to traction in the sense of their aligned axes according to the length, width and a third ax oriented in a transversal sense to the first two one furthermore resistant to shear according to one of said axes which corresponds to the sense of the tide, constitute rows in which the longitudinal perforations of the blocks are respectively aligned, forming in each row a continuous passage common to all of them; and said continuous passages in each row, are passed through by a stringing cable, which ties also the different rows of blocks one to the other, through end bendings of the same cable in the positional transition from one to the other passage.

10. A process for assembling and placing the protection structure of claim 5; characterized by comprising the following steps; arranging the different component blocks of the one and same structure, forming rows of blocks mutually locked one to the other, and also locked between one row and the other; inserting a steel cable through the continuous passages, forming bendings of said cable in the ends of each outlet of said passages, in such a manner that the stringing cable is, as a result, configuring in plane a "zig-zag" path; finishing the ends of said cable in such a manner as to immobilize them against the protection structure; on the other hand, constructing a supporting frame, dimensioned compatibility with the limits of the protecting structure, and vinculating one to the other; on the emplacement bed for the structure, forming a filtering permeable material layer; finally, hoisting the structure suspending it by means of said frame, and lowering it down to said emplacement bed, leaving it supported thereon, previously to which one of the axes of said blocks is oriented in accordance to the sense of the tide.

* * * * *